(12) United States Patent
Fushimi et al.

(10) Patent No.: US 6,996,311 B1
(45) Date of Patent: Feb. 7, 2006

(54) OPTICAL COMMUNICATION DEVICE

(75) Inventors: Masahiro Fushimi, Tokyo (JP); Eiichi Ito, Tokyo (JP); Tomohiro Fujita, Saitama-ken (JP); Tadashi Minakuchi, Saitama-ken (JP); Akira Arimoto, Tokyo (JP); Mitsunori Iima, Saitama-ken (JP); Yoshimi Obara, Tokyo (JP); Shinji Tsukamoto, Saitama-ken (JP); Ryoichi Nakanishi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 139 days.

(21) Appl. No.: 10/701,625

(22) Filed: Nov. 6, 2003

(30) Foreign Application Priority Data

| Nov. 7, 2002 | (JP) | ............................. 2002-323494 |
| Nov. 11, 2002 | (JP) | ............................. 2002-326610 |

(51) Int. Cl.
| G02B 6/26 | (2006.01) |
| G02B 6/42 | (2006.01) |
| G02B 6/32 | (2006.01) |
| G02B 6/36 | (2006.01) |

(52) U.S. Cl. ............................. 385/38; 385/33; 385/93
(58) Field of Classification Search .................. 385/33, 385/93, 38, 123
See application file for complete search history.

(56) References Cited

U.S. PATENT DOCUMENTS

| 5,615,192 A | 3/1997 | Kikukawa et al. |
| 5,745,634 A * | 4/1998 | Garrett et al. ............... 385/140 |
| 5,812,723 A * | 9/1998 | Ohtsu et al. ................. 385/128 |
| 5,812,727 A | 9/1998 | Kanazawa et al. |
| 6,366,726 B1 * | 4/2002 | Wach et al. ................. 385/115 |
| 2004/0213515 A1 * | 10/2004 | Pezeshki et al. .............. 385/31 |

FOREIGN PATENT DOCUMENTS

| JP | 60-246688 | | 12/1985 |
| JP | 61-136566 | | 8/1986 |
| JP | 3-197909 | | 8/1991 |
| JP | 4-502069 | | 4/1992 |
| JP | HEI-4-118975 | * | 5/1992 |
| JP | 5-6564 | | 1/1993 |
| JP | 5-107428 | | 4/1993 |
| JP | 5-313080 | | 11/1993 |
| JP | 5-333232 | | 12/1993 |
| JP | 6-94947 | | 4/1994 |
| JP | 7-174942 | | 7/1995 |
| JP | 7-270642 | | 10/1995 |
| JP | 00-46554 | | 2/2000 |
| JP | 1-305382 | | 10/2001 |
| JP | 2-286977 | | 10/2002 |
| WO | 90/ 06529 | | 6/1990 |

* cited by examiner

Primary Examiner—Frank G. Font
Assistant Examiner—Charlie Peng
(74) Attorney, Agent, or Firm—Greenblum & Bernstein, P.L.C.

(57) ABSTRACT

An optical communication device includes a light source that emits a light beam and an optical fiber having a core and a cladding. The optical fiber has a light entrance face having a core region and a cladding region. The light beam emitted by the light source is converged by a converging lens on the core region and is transmitted through the optical fiber. The entrance face is configured to generate a light intensity distribution in light reflected by the light entrance face depending on a position where the light beam is incident on the entrance face, a converging lens arranged between the light source and the optical fiber.

20 Claims, 6 Drawing Sheets

OPTICAL COMMUNICATION DEVICE

BACKGROUND OF THE INVENTION

The present invention relates to an optical communication device for data communication by transmitting a laser beam, which is modulated in accordance with data to be transmitted, through an optical fiber.

An optical communication device generally includes a laser diode and a converging lens. The laser diode emits a laser beam which is modulated in accordance with data to be transferred. The modulated laser beam is converged by the converging lens on an entrance face of an optical fiber that is connected to the optical communication device. In particular, in the optical communication device known as an ONU (Optical Network Unit), a single optical fiber is used for two-way communication. For this purpose, a light receiving element and a WDM (Wavelength Division Multiplex) filter for separating light having different wavelengths are provided.

In order to efficiently transmit the laser beam through the optical fiber in such an optical communication device, the laser beam should be converged on the center of the core of the entrance face of the optical fiber. This requires very precise positioning of the laser diode and the converging lens against the optical fiber.

An example of a conventional method for positioning the laser diode and the converging lens against the optical fiber is disclosed in Japanese Patent Provisional Publication No. HEI 6-94947. According to the method disclosed in the publication, the light amount of the laser beam passed through the optical fiber is detected at an emerging end. The optical fiber is moved relative to the laser beam until the detected light amount exceeds a predetermined threshold value. When the detected light amount exceeds the predetermined threshold value (preferably, the light amount becomes its maximum value), it is determined that the laser beam emitted from the laser diode impinges on the center of the core of the optical fiber.

However, since it is difficult to visually distinguish the core of the entrance face of the optical fiber from the cladding, the position of the laser diode relative to the optical fiber must be first adjusted by trial and error until the laser beam enters the core of the optical fiber and can be detected on the other end of the optical fiber. This process is troublesome and time consuming.

When the positioning of the laser diode and the converging lens with respect to the optical fiber is achieved, the laser diode and the converging lens are fixed in the optical communication device by an adhesive, for example. However, since the adhesive contracts during a hardening process thereof, the proper alignment of the laser diode, the converging lens, and the optical fiber may be lost due to the contraction of the adhesive, which may worsen the positional relationship of the laser diode and/or the converging lens with respect to the optical fiber. Further, there is also a possibility that the positional relationship of the laser diode and/or the converging lens with respect to the optical fiber may change with time.

In the conventional optical communication device, however, once the laser diode and the converging lens are fixed to the device, it is impossible to re-adjust the positions thereof.

SUMMARY OF THE INVENTION

The present invention is advantageous in that an improved optical communication device that is free from the above defects.

According to an aspect of the invention, there is provided an optical communication device, which includes a light source that emits a light beam and an optical fiber having a core and a cladding. The optical fiber has a light entrance face having a core region and a cladding region. The light beam emitted by the light source is converged by a converging lens on the core region and is transmitted through the optical fiber. The entrance face is configured to generate a light intensity distribution in light reflected by the light entrance face depending on a position where the light beam is incident on the entrance face, a converging lens arranged between the light source and the optical fiber.

The optical communication device further includes a light receiving device, which has a light receiving surface that receives the reflected light that is a reflection of the light beam emitted by the light source and reflected by the entrance face of the optical fiber. The light receiving device outputs a signal corresponding to the light intensity distribution. The optical communication device further includes a beam spot moving structure that is controlled to move the beam spot on the entrance face, and a controller that controls the beam spot moving structure to move the beam spot on the entrance face such that the output signal of the light receiving device corresponds to a reference intensity distribution which is the intensity distribution when the incident position of the light beam is adjusted.

Optionally, the entrance face has a stepped structure in which the core region is formed to be stepped by a predetermined amount with respect to the cladding region. With this stepped structure, the reflected light is diffracted and a diffraction pattern is formed on the light receiving surface of the light receiving device.

According to the embodiments of the invention, a diameter of the beam spot formed on the light entrance face is greater than a diameter of a core region and smaller than a diameter of the cladding region.

Optionally, the light receiving device according to the embodiments is configured to output a signal corresponding to the light intensity distribution in a first direction and another signal corresponding to the light intensity distribution in a second direction that is different from the first direction.

Further optionally, the beam spot moving structure is capable of moving the beam spot on the entrance face of the optical fiber in a third direction and in a fourth direction which is different from the third direction, separately.

In a particular case, the first direction corresponds to the third direction, and the second direction corresponds to the fourth direction.

Alternatively, the first direction is different from each of the third and fourth directions, and the second direction is different from each of the third and fourth directions.

According to embodiments of the invention, the light receiving surface may include a plurality of light receiving areas, each of the light receiving areas being capable of detecting a light amount of light incident thereon. Further, the controller may include a determining system that determines whether the intensity distribution of the light incident on the light receiving surface of the light receiving device equals to the reference intensity distribution in accordance with the light amounts detected by the plurality of light receiving areas.

Optionally, the plurality of light receiving areas may include N×M areas arranged in matrix, where each of N and M is an integer greater than one.

Further optionally, at least one of N and M may be greater than 2, and wherein only four light receiving areas arranged in a 2×2 matrix are used from among the N×M light receiving areas.

In some embodiments, the beam spot moving structure is capable of moving the beam spot on the entrance face of the optical fiber in two different directions, separately, and directions in which the light receiving areas are arranged substantially coincide with the directions where the beam spot moving structure moves the beam spot.

In some embodiments, the beam spot moving structure is capable of moving the beam spot on the entrance face of the optical fiber in two different directions, separately, and directions in which the light receiving areas are arranged are different from the directions where the beam spot moving structure moves the beam spot.

In a particular case, the core region is protruded toward the light source with respect to the cladding region.

Optionally, the core region is protruded with respect to the cladding region by an amount less than $\lambda/(4n)$, where $\lambda$ is a wavelength of the light beam emitted by the light source and n is a refractive index of medium in which the light beam proceeds.

In a particular case, the core region is protruded with respect to the cladding region by an amount substantially equal to $\lambda/(8n)$.

In some embodiments, the core region is parallel with the cladding region.

In some embodiments, the entrance face is substantially perpendicular to the optical axis of the optical communication device.

Alternatively, the entrance face is inclined with respect to a plane perpendicular to the optical axis of the optical communication device.

Optionally, the optical communication device may further include a beam splitter that allows at least a part of the light beam emitted by the light source toward the entrance face, the beam splitter directing at least a part of the reflected light toward the light receiving device.

Since the reflection light is used for adjusting the position of the beam spot on the entrance face of the optical fiber, the controller can control the beam spot moving structure to move the beam spot even when data is being transmitted.

DETAILED DESCRIPTION OF THE EMBODIMENTS

Hereinafter, optical communication devices according to embodiments of the present invention will be described with reference to the accompanying drawings.

Figure 1:
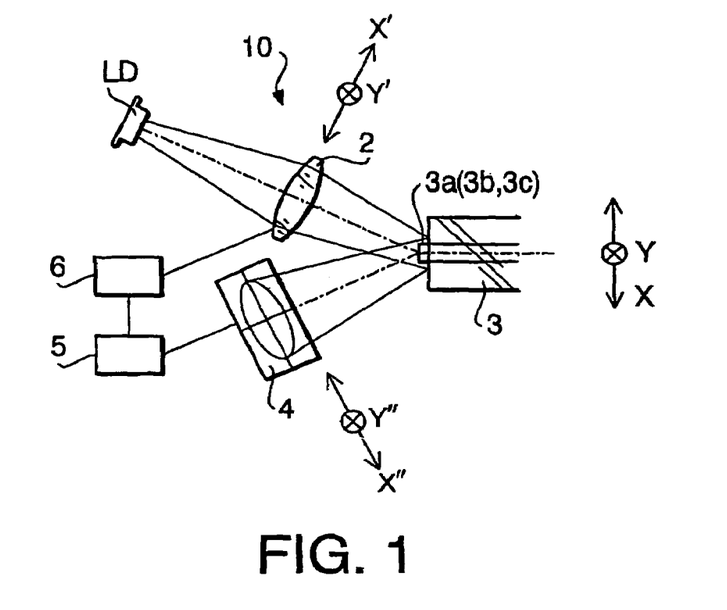
FIG. 1 schematically shows a configuration of an optical communication device according to a first embodiment of the invention.

FIG. 1 schematically illustrates a configuration of an optical communication device 10 according to a first embodiment of the invention. The optical communication device 10 according to the present embodiment can be utilized, for example, as an optical network unit (ONU) that connects a terminal such as a subscriber's computer with an optical fiber network. The optical communication device 10 is designed with a wavelength division multiplexing (WDM) technology that transports bi-directional signal over a single optical fiber. The optical communication device 10 utilizes light of which wavelength is 1.3 $\mu$m for transmitting data and light of which wavelength is 1.5 $\mu$m for receiving data.

As shown in FIG. 1, the optical communication device 10 is provided with a laser diode LD, a converging lens 2, a photo detector 4, a controller 5 and an actuator 6.

Figure 2:
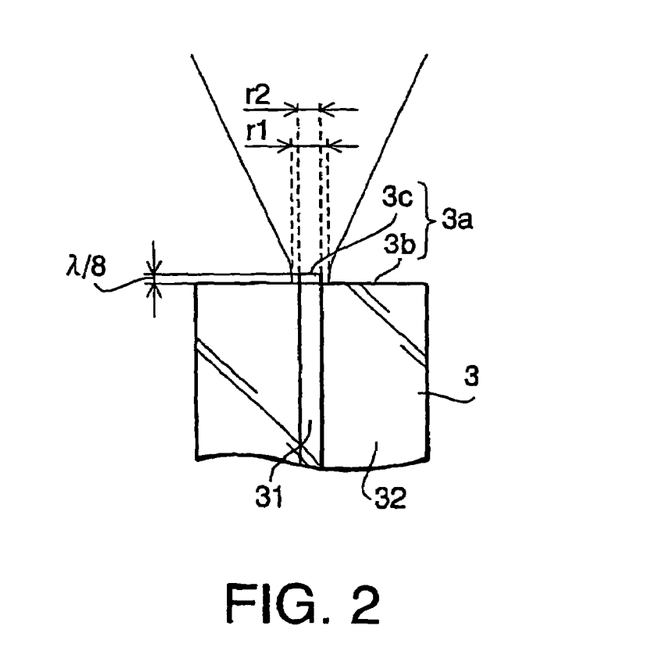
FIG. 2 shows an enlarged side view of the optical fiber at a light entrance face thereof.

FIG. 2 shows an enlarged side view of a beam incident end portion of the optical fiber 3 employed in the optical communication device 10. As shown in FIG. 2, the optical fiber 3 has a core 31 and a cladding 32, and the entrance face (i.e., the end face of the portion where the laser beam is incident) 3a has a core region 3c and a cladding region 3b respectively corresponding to the core 31 and the cladding 32 and have a circular shape. According to the embodiment, the core region 3c is protruded with respect to a plane of the cladding region 3b by an amount of $\lambda/(8n)$ (where, $\lambda$ is a wavelength of the laser beam emitted by the laser diode LD, and n is a refractive index of medium where the light proceeds) in a direction perpendicular to the plane of the cladding region 3b. Since the light proceeds in the air, n can be considered as one, and thus the protruded amount is $\lambda/8$ in this embodiment. The plane of the core region 3c and the plane of the cladding region 3b are parallel with each other. This stepped structure can be formed with use of photolithography technology.

The laser diode LD emits a laser beam that is modulated in accordance with data to be transmitted through an optical fiber 3, which is connected to the optical communication device 10.

The converging lens 2 is placed in the optical path of the laser beam emitted from the laser diode LD, and converges the laser beam on the entrance face 3a of the optical fiber 3 to form a beam spot thereon. A part of the laser beam incident on the entrance face 3a transmits through the optical fiber 3, while a remaining part of the laser beam is reflected by the entrance face 3 and enters the photo detector 4. It should be noted that, for the sake of illustration, the incident angle of the laser beam with respect to the entrance face 3a is exaggerated, and it is preferable that the incident angle is as small as possible, with allowing the reflection light to impinge on the photo detector 4.

The converging lens 2 is configured to be movable in a first direction (X' direction in FIG. 1) which is perpendicular to the optical axis of the converging lens 2 and on a plane including the optical axes of the converging lens 2 and the optical communication device 10, and in a second direction (Y' direction) which is perpendicular to the optical axis of the optical communication device 10 and perpendicular to the first direction by the actuator 6. The controller 5 controls the actuator 6 to move the converging lens in accordance with the output of the photo detector 4, which will be described in detail later. In accordance with the movement of the converging lens 2 in the X' direction and in the Y' direction, the beam spot moves on the entrance face 3a in the X direction and the Y direction, respectively. The X and Y directions are parallel with the entrance face 3a and perpendicular to each other.

As shown in FIG. 2, the beam spot formed on the entrance face 3a has a diameter r1 slightly larger than a diameter r2 of the core region 3a. Therefore, when the center of the beam spot coincides with the center of the core region 3c, a peripheral portion of the beam spot is incident on the cladding region 3b.

With this configuration, when the laser beam is incident on the core region 3c and the cladding region 3b simultaneously, a diffraction pattern is formed by the reflected light on the photo detector 4. It should be noted that the protruded amount of the core region 3c with respect to the cladding region 3b is set to less than $\lambda/(4n)$, where n is a refractive index of medium. When the medium is air, n is considered to be one. In the present embodiment, the protruded amount is set to $\lambda/8$.

Generally, a beam spot size of the laser beam is defined as an area having an intensity greater than $1/e^2$ of the peak intensity thereof (e being a base of natural logarithm). It is preferable that the diffraction pattern is formed with light having a relatively strong intensity. When the beam spot size is large, the diffraction pattern formed on the photo detector 4 is clear. However, even a portion of a beam having the intensity of $1/e^2$ or lower with respect to the peak intensity, the diffraction pattern is formed on the photo detector 4.

When the beam spot formed on the entrance face 3a is larger, the pattern formed on the photo detector 4 becomes clearer, however the coupling efficiency becomes worse. When the beam spot is smaller, the pattern on the photo detector 4 becomes faint, while the coupling efficiency is improved. In the above embodiment, considering the balance between the diffraction pattern and the coupling efficiency, the diameter of the beam spot on the entrance face 3a is slightly greater than the diameter of the core region 3c. For example, the diameter of the beam spot is 11 μm and the diameter of the core region 3c is 10 μm. The invention is not limited to this configuration, and even through the beam spot size is smaller than the size of the core region 3c, the diffraction pattern may be formed on the photo detector 4, and thus, the beam spot position on the entrance face 3a can be adjusted.

According to the first embodiment, in order to make the laser beam reflected by the entrance face 3a of the optical fiber 3 directly impinge on the photo detector 4, the optical communication device 10 is configured such that the laser beam is incident on the entrance face 3a at an incident angle other than 0°.

Figure 3:
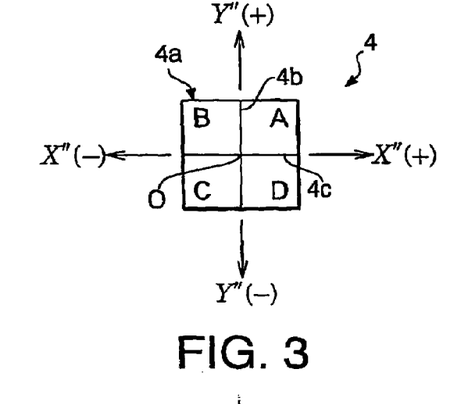
FIG. 3 schematically shows a front view of a photo detector.

FIG. 3 schematically shows a front view of the photo detector 4. The photo detector 4 has a light receiving surface 4a. The light receiving surface 4a is divided into four light receiving areas A, B, C and D, which are divided by first and second boundary lines 4b and 4c, crossing at a center O of the light receiving area 4a. The directions in which the first and second boundary lines 4b and 4c divide the light receiving area (i.e., the directions in which 4c and 4b extend) will be referred to as an X" direction and a Y" direction, respectively.

In the first embodiment, the photo detector 4 is arranged such that, when the converging lens 2 is moved in the X' direction and the beam spot shifts on the entrance face 3a in the X direction, the intensity distribution on the light receiving area 4a changes in the X" direction, and when the converging lens 2 is moved in the Y' direction and the beam spot shifts on the entrance face 3a in the Y direction, the intensity distribution on the light receiving area 4a changes in the Y" direction. Each of the light receiving areas A, B, C and D, outputs a voltage corresponding to the received amount of light, which is input to the controller 5. In FIG. 3, a circle drawn with broken lines represents an outline of the beam spot formed by the reflected light.

In this specification, directions are defined with reference to the X and Y directions in which the beam spot formed on the entrance face 3a moves. In FIG. 1, when the entrance face 3a of the optical fiber 3 is viewed from the laser diode LD side, the left-hand direction is defined as a positive X direction (indicated as X(+)), the right-hand direction is defined as a negative X direction (indicated as X(−)), an upper direction is a positive Y direction (indicated as Y(+)), and a lower direction is a negative Y direction (indicated as Y(−)).

According to the embodiment, a diffraction pattern is formed on the photo detector 4. The intensity distribution across the diffraction pattern varies depending on a position of a beam spot on the entrance face 3a of the optical fiber 3. Specifically, based on the intensity distribution in the X direction, displacement of the beam spot on the entrance face 3a in the X direction can be known, and based on the intensity distribution in the Y direction, displacement of the beam spot on the entrance face 3a in the Y direction can be known. If the intensity distributions in X and Y directions when the center of the beam spot coincide with the center of the core 31 are known in advance, by moving the beam spot so that the intensity distributions in the X and Y directions coincide with the known distributions, the position of the beam spot can be adjusted.

Figure 4A:
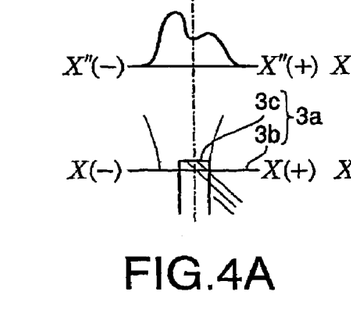
FIGS. 4A–4C show a relationship between positions on which a beam is incident on the end face of the optical fiber and intensity distribution of reflected beams.
Figures 4B, 4C:
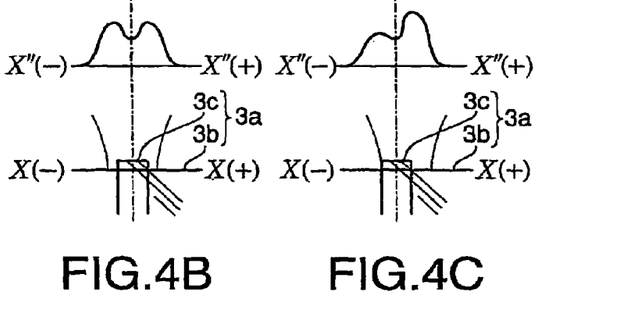

FIGS. 4A–4C shows a relationship between positions (in the X direction) on which a beam is incident on the entrance face 3a of the optical fiber and intensity distribution of reflected beams on the light receiving area 4a of the photo detector 4 (in the X" direction).

It is assumed that when the beam spot is incident on the entrance face 3a of the optical fiber 3 such that the center of the beam spot coincides with the center of the core region 3c, the intensity distribution is substantially symmetrical with respect to the center O of the photo detector 4 as shown in FIG. 4B. The intensity distribution when the center of the beam spot coincides with the center of the core region 3c will be referred to as a reference distribution.

When the beam spot incident on the entrance face 3a of the optical fiber 3 is shifted in X(−) direction, the intensity distribution of the diffraction pattern deforms as shown in FIG. 4A. When the beam spot incident on the entrance face 3a of the optical fiber 3 is shifted in X(+) direction, the intensity distribution of the diffraction pattern deforms as shown in FIG. 4C. When the intensity distribution has the form as shown in FIG. 4A or FIG. 4C, by shifting the beam spot incident on the entrance face 3a of the optical fiber 3 so that the intensity distribution coincides with the reference distribution, the center of the beam spot coincides with the center of the core region 3c.

According to the embodiment, the position of the beam spot on the entrance face 3a of the optical fiber 3 is controlled by making use of the above relationship of the position of the beam spot on the entrance face and the intensity distribution of the diffraction pattern on the light receiving area 4a of the photo detector 4.

Practically, the control of the position of the beam spot is performed as follows. As described above, the photo detector 4 has four light receiving areas A, B, C and D (see FIG. 3), each detects the amount of light incident thereon. An integration value of the intensity distribution is considered to be an amount of light.

In the example shown in FIGS. 4A–4C, whether the intensity distribution coincides with the reference distribution can be determined by comparing the amount of light detected by the X" (−) side light receiving areas B and C with the amount of light detected by the X"(+) side light receiving areas A and D. That is, if the amount of light detected by the X"(−) side light receiving areas B and C is greater than the amount of light detected by the X" (+) side light receiving area A and D, it is considered that the beam spot is displaced on the X(−) side as shown in FIG. 4A.

Figure 5:
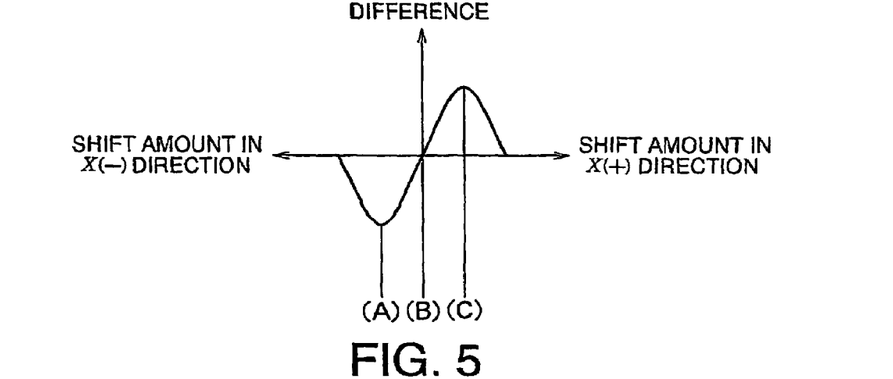
FIG. 5 is a graph illustrating a relationship between a light amount and a displacement of the beam on the end face of the optical fiber.

If the amount of light detected by the X"(−) side light receiving areas B and C is smaller than the amount of light detected by the X" (+) side light receiving area A and D, it is considered that the beam spot is displaced on the X(+) side as shown in FIG. 4C. Generally, from a difference between the light amounts detected by the X" (−) side sensors and the light amounts detected by the X"(+) side sensors, whether the beam spot is shifted on the X(−) side or the X(+) side is known. FIG. 5 is a graph showing a relationship of the difference between the light amounts detected by the X"(−) side sensors and detected by the X"(+) sensors and the shifting amount of the beam spot in the X direction.

Figure 6:
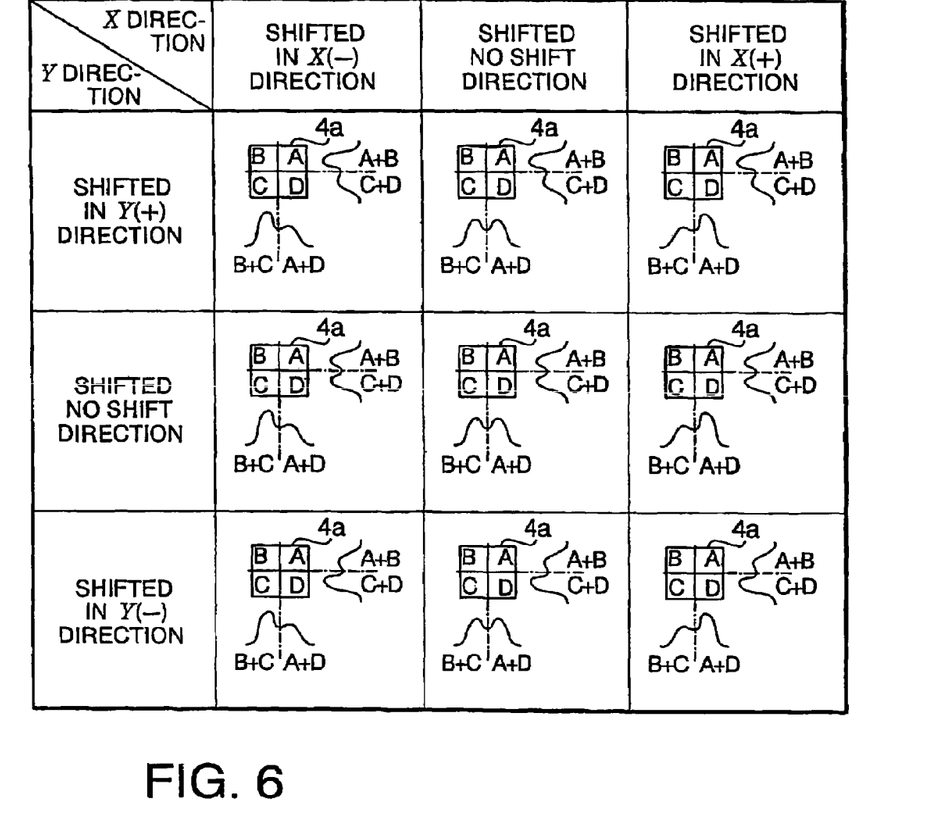
FIG. 6 shows a relationship between positions on which a beam is incident on the end face of the optical fiber and intensity distribution of reflected beams.

A similar discussion applies with respect to the relationship of the beam spot position in the Y direction. FIG. 6 is a chart showing the shift of the beam spot on the entrance face 3a of the optical fiber 3 in the X and the Y directions, and the corresponding intensity distributions on light receiving surface 4a of the photo detector 4 and outputs of the light receiving areas to be compared.

For example, in a case of the lower-right cell of FIG. 6, the graphs (curves) show that the beam spot is displaced on the X(+) side and on the Y(−) side as indicated in the upper-right title cell and in the lower-left title cell. This judgment is made by comparing the outputs of the light receiving areas (B+C) with the outputs of the light receiving areas (A+D) for the shift in the X direction, and by comparing the outputs of the light receiving areas (A+B) with the outputs of the light receiving areas (C+D) for the shift in the Y direction. Please note that, for the sake of brevity, the value representing the detected light amount is denoted by the name of the light receiving area (e.g., the value detected by the light receiving area A is also represented as "A").

In the example shown in FIG. 6, when the center of the beam spot coincides with the center of the core region 3c, the intensity distributions on the X"(−) side and on the X"(+) side are the same, and the intensity distributions on the Y" (−) side and on the Y"(+) side are the same. Therefore, B+C=A+D, and A+B=C+D. In other cases, i.e., the comparison results shows some difference between the detected light amounts, the controller 5 controls the actuator 6 so that the difference becomes zero.

It should be noted that, since the reflected light is used for adjusting the position of the beam spot on the entrance face 3a of the optical fiber 3, the controller 5 repeatedly or continuously executes the above-described position adjusting procedure even when the optical data is being transmitted.

In the above-described embodiment, the X direction is perpendicular to the Y direction. The photo detector 4 is arranged such that the differences between the light amounts corresponding to the intensity distributions in the X direction and in the Y direction are output (the boundary lines 4b and 4c tend in Y and X directions, respectively). Then, the controller 5 controls the actuator 6 to move the converging lens 2 in the X direction and Y direction.

The invention need not be limited to the above structure. The X and Y directions may form another angle other than 90 degrees. The boundary lines 4b and 4c need not be perpendicular to each other. Further, the orientation of the boundary lines 4b and 4c may different from the X and Y directions.

Figure 7:
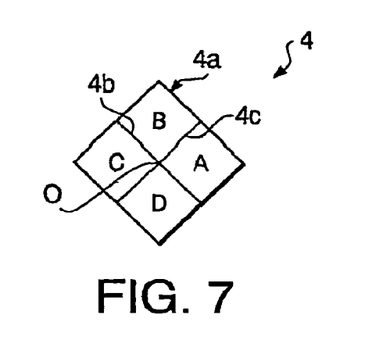
FIG. 7 shows an alternative arrangement of the photo detector.

FIG. 7 shows an alternative arrangement of the photo detector 4. The photo detector 4 is oriented such that the Y" and X" directions (i.e., the boundary lines 4b and 4c) are rotated clockwise by 45 degrees at the center thereof. When the photo detector 4 is oriented in this way, the outputs A and C are compared to examine the intensity distributions for adjusting the position of the beam spot in the X direction, and the outputs B and D are compared to examine the intensity distributions for adjusting the position of the beam spot in the Y direction.

Figure 8:
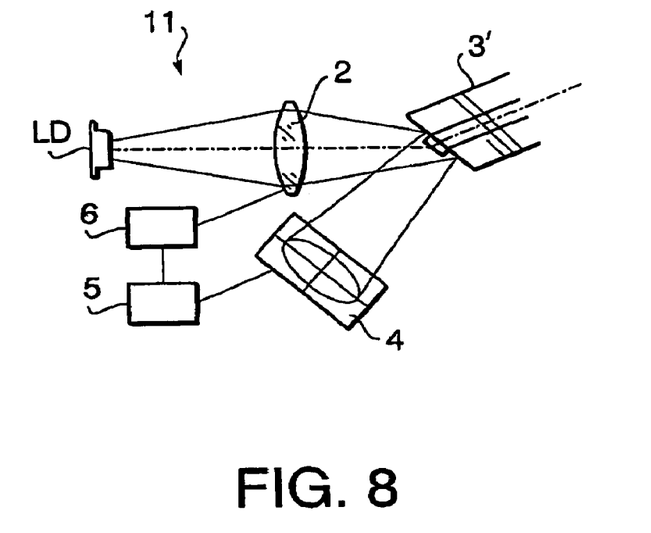
FIG. 8 shows an optical communication device according to a second embodiment.

FIG. 8 shows an optical communication device 11 according to a second embodiment. In the optical communication device 11, an optical fiber 3' is used, which is configured such that the entrance face is inclined with respect to the central axis of the optical fiber 3'. Specifically, the laser diode LD, the converging lens 2 and the optical fiber 3' are arranged so that the chief ray of the beam incident on the core of the optical fiber 3' proceeds substantially along the central axis of the optical fiber 3'. With this arrangement, a coupling efficiency between the laser diode LD and the converging lens 2 with respect to the optical fiber 3 is improved.

Figure 9:
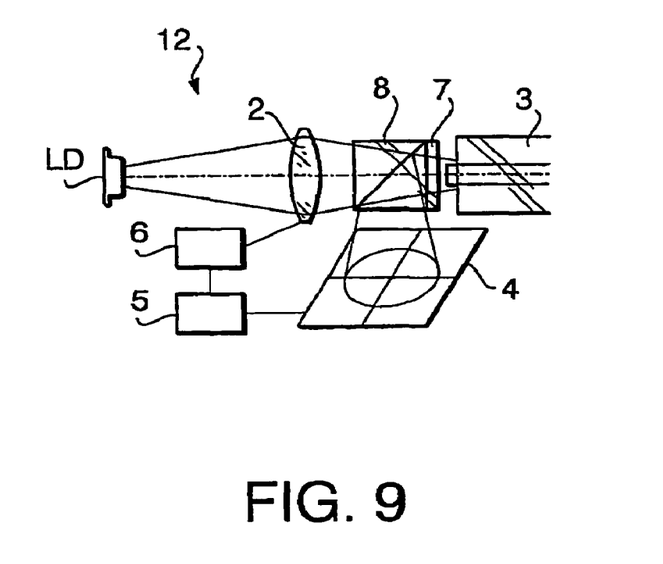
FIG. 9 shows an optical communication device according to a third embodiment.

FIG. 9 shows an optical communication device 12 according to a third embodiment. In this embodiment, the laser diode LD, the converging lens 2 and the optical fiber 3 have a common optical axis (when the laser beam is incident on the core of the optical fiber 3). With this configuration, the light reflected on the entrance face 3a of the optical fiber returns the same optical path of the incident beam.

For directing the reflected light toward the photo detector 4, a deflector having a polarization beam splitter 8 and λ/4 plate 7 is inserted between the entrance face 3a of the optical fiber 3 and the converging lens 2. Generally, the laser beam emitted by the laser diode is linearly polarized. An axis of polarization of the polarization beam splitter 8 is adjusted so that the beam emitted by the laser diode LD passes through the polarization beam splitter 8. Since the λ/4 plate 7 is provided on the optical fiber side of the polarization beam splitter 8, the beam passed through the deflector is incident on the entrance face 3a of the optical fiber as a circular polarized beam. The reflected beam then passes through the λ/4 plate 7 again and enters the polarization beam splitter 8 as the linearly polarized beam. It should be noted that the axis of the polarization of the beam reflected by the entrance face 3a and passed through the λ/4 plate 7 is perpendicular to the axis of the polarization emitted by the laser diode LD, and thus the reflected beam is deflected by the polarization beam splitter 8 toward the photo detector 4.

Detection of the light amounts corresponding to the intensity distributions and adjustment of the incident position of the beam on the entrance face 3a is similar to the above-described embodiments.

Figure 10:
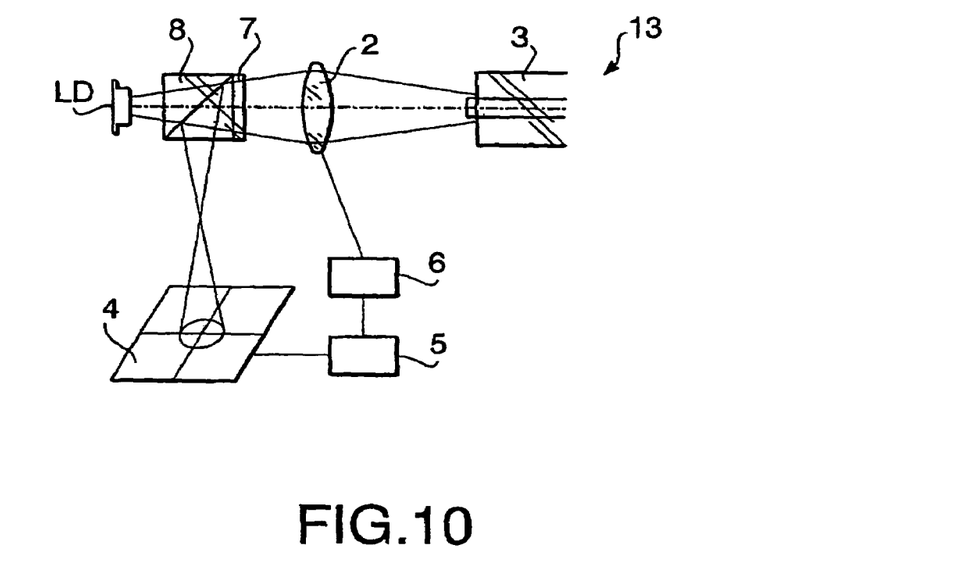
FIG. 10 shows an optical communication device according to a fourth embodiment.

FIG. 10 shows an optical communication device 13 according to a fourth embodiment. The optical communication device 13 is similar to the optical communication device 12 except that the deflector (i.e., the polarization beam splitter 8 and the λ/4 plate 7) is arranged between the laser diode LD and the converging lens 2. Due to this arrangement, the laser beam reflected on the entrance face 3a of the optical fiber 3 passes through the converging lens 2, and is once converged and then incident on the photo detector 4 as a diverging beam to project the diffraction pattern.

Figure 11:
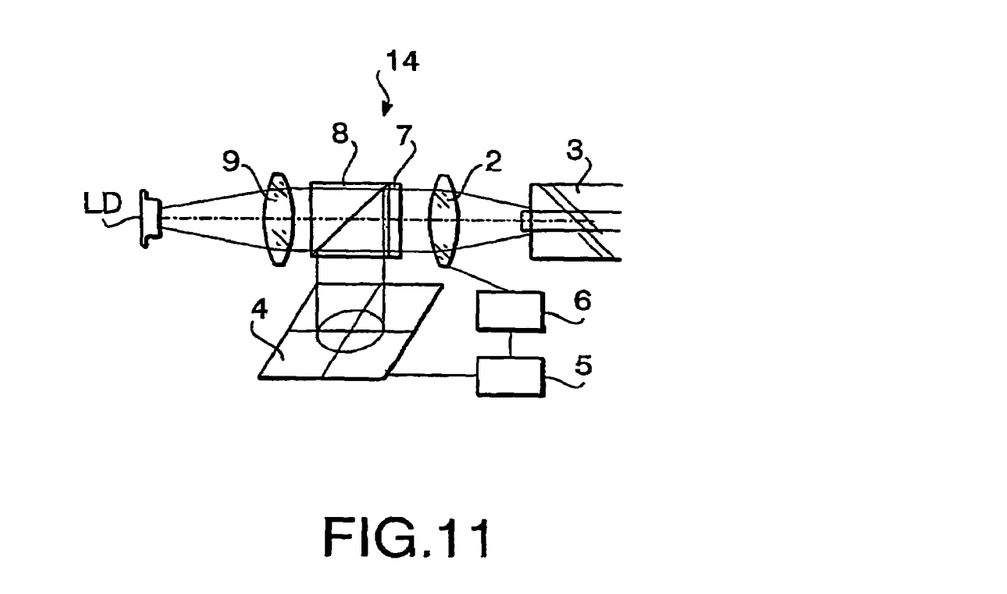
FIG. 11 shows an optical communication device according to a fifth embodiment.

FIG. 11 shows an optical communication device 14 according to a fifth embodiment. In the optical communication device 14, a collimating lens 9 is employed. The laser beam emitted by the laser diode LD is collimated by the collimating lens 9, and then converged by the converging lens 2 on the entrance face 3a of the optical fiber 3. In this embodiment, the deflector including the polarization beam splitter 8 and the λ/4 plate 7 is arranged between the collimating lens 9 and the converging lens 2. Except for the above differences, the configuration of the optical communication device 14 is similar to the configuration of the third or fourth embodiment. It should be noted that the collimating lens 9 is sometimes provided integrally with the laser diode LD, and in such a case, the configuration of the fifth embodiment is particularly applicable. It should be noted that, similar to the third or forth embodiment, the deflector may be arranged between the laser diode LD and the collimating lens 9, or between the converging lens 2 and the optical fiber 3.

In the above-described embodiments, it is assumed that when the center of the beam spot on the entrance face 3a coincides with the center of the core region 3c, the intensity distribution of the diffraction pattern formed by the reflected light exhibits a symmetrical distribution both in the X" direction and in the Y" direction (or the directions where the intensity distribution changes as the converging lens 2 moves) with respect to the center O of the photo detector 4 (see FIGS. 3 and 4B).

In practice, due to individual differences, the intensity distribution may deviate from the state shown in FIG. 4B. Further, due to variation over time, the intensity distribution may also deviate. In such a case, for example, even if a difference between (B+C) and (A+D) is zero, the center of the beam spot may not coincide with the center of the core region 3c.

The above problem can be overcome by increasing or decreasing the outputs of the light receiving areas in accordance with the deviation. For example, in the X" direction, (B+C) or (A+D) may be increased by a predetermined amount. Practically, this means that the difference between (B+C) and (A+D) equals the predetermined amount. Therefore, in order to deal with the deviation of the intensity distribution as described above, the controller 5 controls the actuator 6 so that the difference between the light amount on the positive side (X"(+) or Y"(+) direction) and the light amount of the negative side (X"(−) or Y"(−) direction) becomes the predetermined amount.

In the above-described embodiments, the photo detector 4 having four light receiving areas A–D is employed. The invention need not be limited to the configuration, and a photo detector having a plurality of light receiving areas may be employed. For example, N×M light receiving areas (each of N and M being an integer greater than one) may be arranged in a matrix (to form a grid pattern). In particular, when N and M are greater than two, even if the center of the diffraction pattern shifts due to individual differences and/or variation over time, appropriate four light receiving areas (arranged in 2×2) a center of which coincides with or is close to the center of the diffraction pattern formed by the reflected light can be selected, and the adjusting the beam position can be performed precisely.

In the above embodiment, the converging lens 2 is moved to adjust the incident position of the laser beam on the entrance face 3a of the optical fiber 3. It should be noted that the invention is not limited to such a configuration, and any other suitable measure can be used, which will be described with reference to FIG. 12.

Figure 12:
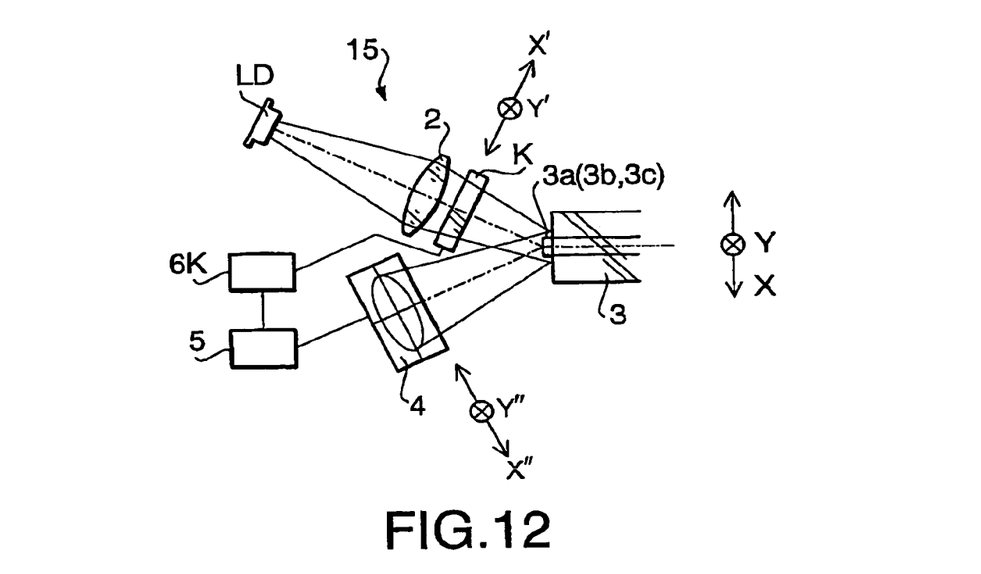
FIG. 12 shows an optical communication device according to a sixth embodiment.

FIG. 12 shows an optical communication device 15 according to a sixth embodiment of the invention. The optical communication device 15 is similar to the optical communication device 10 shown in FIG. 1 except that the converging lens 2 is not movable, that an transmission type deflector K is provided on the optical path from the laser diode LD to the entrance face 3a of the optical fiber 3, and that an actuator 6K for driving the deflector K is provided instead of the actuator 6.

In the configuration shown in FIG. 12, the deflector K is arranged between the converging lens 2 and the entrance face 3a of the optical fiber 3. The deflector K is a single or plurality of optical elements capable of varying the optical path of the laser beam passed therethrough so that a position of the beam spot formed on the entrance face 3a can be controlled.

Figure 13:
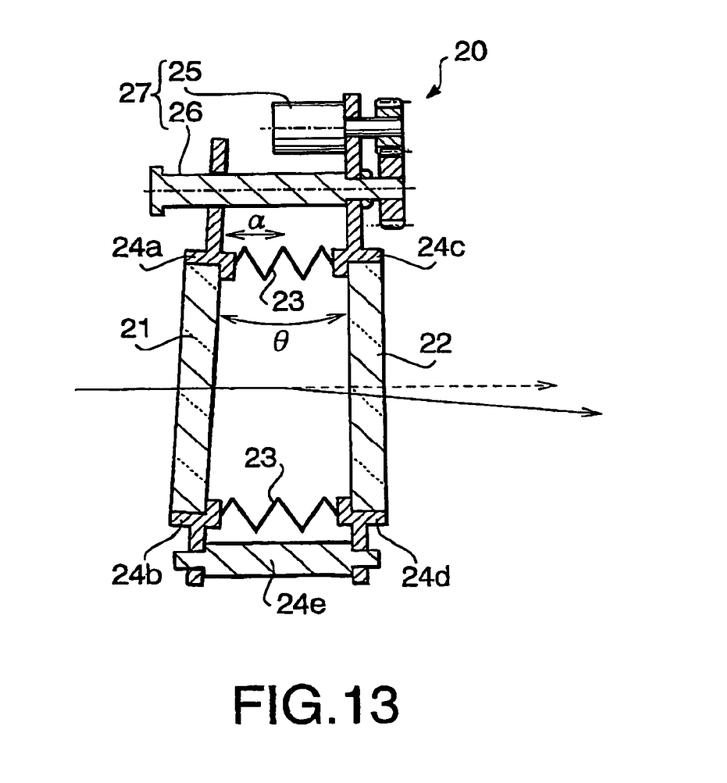
FIG. 13 shows an example of a variable angle prism employed in the optical communication device shown in FIG. 12.

FIG. 13 shows a cross sectional view of a variable angle prism 20 which is used for the transmission type deflector K.

The variable angle prism 20 has two glass plates 21 and 22, and an accordion-foldable elastic cover 23 connecting the glass plate 21 and 22. Each of the glass plates 21 and 22 has a sufficient size (area) so that the laser beam to be converged on the entrance face 3a can pass therethrough. The glass plates 21 and 22 and the cover 23 enclose colorless liquid having a certain refractive index (e.g., Silicon oil). The glass plates 21 and 22 are held by glass holders 24a, 24b, 24c and 24d.

A distance between the glass holders 24b and 24d is maintained with a plurality of spacers 24e disposed therebetween. The glass holder 24c is secured to an angle adjusting unit 27, while the glass holder 24a is movably held by the angle adjusting unit 27. Specifically, the glass holder 24a engages with a lead screw 26 of the angle adjusting unit 27. The lead screw is can be rotated by the motor 25 through a gear train. As the motor 25 is driven to rotate the lead screw 26, the glass holder 24a moves in the direction of the rotational axis of the lead screw, thereby an angle θ formed between the glass plates 21 and 22 on a plane, is parallel with the rotation axis of the lead screw and perpendicular to the surfaces of the glass plates 21 and 22. The plane along which the angel θ is defined will be referred to an axis of the variable angle.

As the deflector K (see FIG. 12), a pair of variable angle prisms 20 may be employed with the orientation of the axes of variable angles differentiated from each other. For example, one of the axes of the variable angle is parallel with the X direction and the other parallel with the Y direction.

With such a configuration, without moving the converging lens 2, and only by changing the angle θ of each variable angle prism 20, the beam position on the entrance face 3a can be changed arbitrarily. Such a configuration which does not move the converging lens is particularly convenient when the converging lens cannot be moved (e.g., when the converging lens is formed integrally with the laser diode). When the pair of variable angle prisms 20 are employed, both prisms may be located on the same side (e.g., on the LD side or on the optical fiber side 1). Alternatively, one of the variable angle prisms 20 may be arranged between the laser diode and the converging lens 2, while the other may be located between the converging lens 2 and the optical fiber 3.

The above-described structure of the variable angle prism is only an exemplary one of such a prism and various types of variable angle prism can be used as the deflector K.

It should be noted that, in FIG. 13, the variable angle prism 20 has only one axis of variable angle. It is possible to employ one variable angle prism having two axes of variable angles as the deflector K instead of two one-axis variable angle prisms.

Alternatively, the optical communication device may be configured such that the converging lens 2 and one-axis variable angle prism 20 are movably arranged to adjust the position of the beam spot on the entrance face 3a of the optical fiber 3.

The present disclosure relates to the subject matters contained in Japanese Patent Application No. 2002-326610 filed on Nov. 11, 2003, and Japanese Patent Application No. 2002-323494 filed on Nov. 7, 2003, which are expressly incorporated herein by reference in their

What is claimed is:

1. An optical communication device, comprising:
   a light source that emits a light beam;
   an optical fiber having a core and a cladding, said optical fiber having a light entrance face having a core region and a cladding region, the light beam emitted by said light source being incident on the core region and being transmitted through said optical fiber, the entrance face being configured to generate a light intensity distribution in light reflected by said light entrance face depending on a position where the light beam is incident on the entrance face;
   a converging lens arranged between the light source and the optical fiber, said converging lens converging the light beam emitted by said light source to form a beam spot on the entrance face of said optical fiber;
   a light receiving device having a light receiving surface that receives the reflected light that is a reflection of the light beam emitted by said light source and reflected by the entrance face of said optical fiber, said light receiving device outputting a signal corresponding to the light intensity distribution;
   a beam spot moving structure that is controlled to move the beam spot on the entrance face; and
   a controller that controls the beam spot moving structure to move the beam spot on the entrance face such that the output signal of said light receiving device corresponds to a reference intensity distribution which is the intensity distribution when the incident position of the light beam is adjusted,
   the entrance face having a stepped structure in which the core region is stepped by a predetermined height with respect to the cladding region, the reflected light being diffracted by the stepped structure, a diffraction pattern being formed on said light receiving surface of said light receiving device by the reflected light.

2. The optical communication device according to claim 1, wherein a diameter of the beam spot formed on said light entrance is greater than a diameter of a core region and smaller than a diameter of the cladding region.

3. The optical communication device according to claim 2, wherein said light receiving device is configured to output a signal corresponding to the light intensity distribution in a first direction and another signal corresponding to the light intensity distribution in a second direction that is different from the first direction.

4. The optical communication device according to claim 3, wherein said beam spot moving structure is configured to move the beam spot on the entrance face of said optical fiber in a third direction and in a fourth direction which is different from the third direction, separately.

5. The optical communication device according to claim 4, wherein the first direction corresponds to the third direction, and wherein the second direction corresponds to the fourth direction.

6. The optical communication device according to claim 4, wherein the first direction is different from each of the third and fourth directions, and wherein the second direction is different from each of the third and fourth directions.

7. The optical communication device according to claim 2,
   wherein said light receiving surface includes a plurality of light receiving areas, each of said light receiving areas being capable of detecting an amount of light incident thereon, and
   wherein said controller includes a determining system that determines whether the intensity distribution of the light incident on the light receiving surface of said light receiving device equals the reference intensity distribution in accordance with the light amounts detected by said plurality of light receiving areas.

8. The optical communication device according to claim 7, wherein said plurality of light receiving areas includes N×M areas arranged in matrix, where each of N and M is an integer greater than one.

9. The optical communication device according to claim 8, wherein at least one of N and M is greater than 2, and wherein only four light receiving areas arranged in a 2×2 matrix are used from among the N×M light receiving areas.

10. The optical communication device according to claim 8,
    wherein said beam spot moving structure is configured to move the beam spot on the entrance face of said optical fiber in two different directions, separately, and
    wherein directions in which said light receiving areas are arranged substantially coincide with the directions in which the beam spot moving structure moves the beam spot.

11. The optical communication device according to claim 8,
    wherein said beam spot moving structure is configured to the beam spot on the entrance face of said optical fiber in two different directions, separately, and
    wherein directions in which said light receiving areas are arranged are different from the directions in which the beam spot moving structure moves the beam spot.

12. The optical communication device according to claim 2, wherein said core region protrudes toward said light source with respect to said cladding region.

13. The optical communication device according to claim 12, wherein said core region protrudes with respect to said cladding region by an amount less than λ/(4n), where λ is a wavelength of the light beam emitted by said light source and n is a refractive index of medium in which the light beam proceeds.

14. The optical communication device according to claim 13, wherein said core region protrudes with respect to said cladding region by an amount substantially equal to λ/(8n).

15. The optical communication device according to claim 2, wherein said core region is parallel with said cladding region.

16. The optical communication device according to claim 15, wherein said entrance face is substantially perpendicular to the optical axis of the optical communication device.

17. The optical communication device according to claim 15, wherein said entrance face is inclined with respect to a plane perpendicular to the optical axis of the optical communication device.

18. The optical communication device according to claim 17, further including a beam splitter that directs at least a part of the light beam emitted by said light source toward said entrance face, said beam splitter directing at least a part of the reflected light toward said light receiving device.

19. The optical communication device according to claim 1, wherein said controller controls said beam spot moving structure to move the beam spot even when data is being transmitted.

20. An optical communication device, comprising:
an optical fiber having a core and a cladding, said optical fiber having a light entrance face having a core region and a cladding region, a beam spot being incident on the core region and being transmitted through said optical fiber, the entrance face being configured to generate a light intensity distribution in light reflected by said light entrance face depending on a position where the beam spot is incident on the entrance face;
a converging lens configured to from the beam spot on the entrance face;
a light receiving device having a light receiving surface that receives reflected light that is a reflection of the beam spot reflected by the entrance face of said optical fiber, said light receiving device outputting a signal corresponding to the light intensity distribution;
a beam spot moving structure that is controlled to move the beam spot on the entrance face; and
a controller that controls the beam spot moving structure to move the beam spot on the entrance face such that the output signal of said light receiving device corresponds to a reference intensity distribution which is the intensity distribution when the incident position of the light beam is adjusted,
the entrance face having a stepped structure in which the core region is stepped by a predetermined height with respect to the cladding region, the reflected light being diffracted by the stepped structure, a diffraction pattern being formed on said light receiving surface of said light receiving device by the reflected light.

* * * * *